W. W. HILL.
UNDERCUTTING TOOL FOR COMMUTATORS.
APPLICATION FILED APR. 26, 1922.

1,438,645. Patented Dec. 12, 1922.

Inventor
Wm. W. Hill.
By his Attorney
James F. Williamson

Patented Dec. 12, 1922.

1,438,645

UNITED STATES PATENT OFFICE.

WILLIAM W. HILL, OF HUTCHINSON, MINNESOTA.

UNDERCUTTING TOOL FOR COMMUTATORS.

Application filed April 26, 1922. Serial No. 556,702.

*To all whom it may concern:*

Be it known that I, WILLIAM W. HILL, a citizen of the United States, residing at Hutchinson, in the county of McLeod and State of Minnesota, have invented certain new and useful Improvements in Undercutting Tools for Commutators; and I do hereby declare the following to be a full, clear, and exact description of the invention, such as will enable others skilled in the art to which it appertains to make and use the same.

This invention relates to a hand tool particularly adapted for undercutting mica or other insulating material on the commutators of electrical motors or generators.

It is an object of this invention to provide a simple flat tool in the nature of a milling tool for the purpose stated.

It is a further object of the invention to provide such a tool comprising a toothed bar together with means for detachably holding the same including a suitable handle.

These and other objects and advantages of the invention will more fully appear from the following description made in connection with the accompanying drawings, in which like reference characters refer to the same parts throughout the different views and, in which, Fig. 1 is a view in side elevation of the tool illustrating the use of the same in connection with the commutator of an electrical machine;

Figure 1:
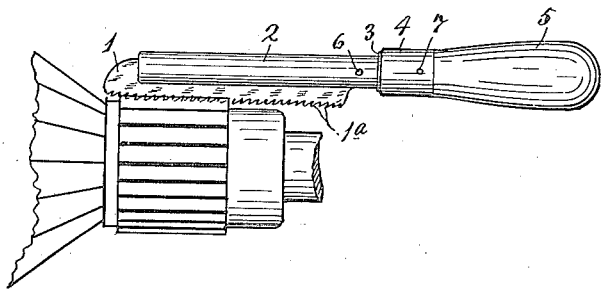
Figure 2:
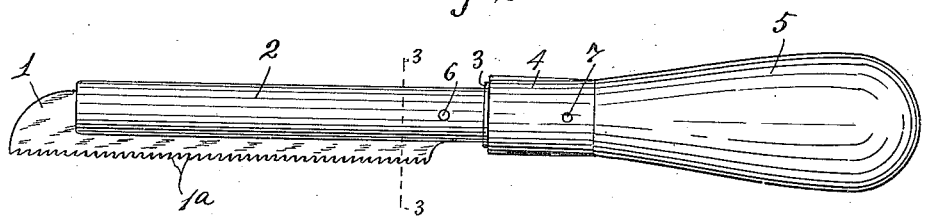
Fig. 2 is a view in side elevation of the tool shown on an enlarged scale.
Figure 3:
Fig. 3 is a vertical section taken on line 3—3 of Fig. 2.
Figure 4:
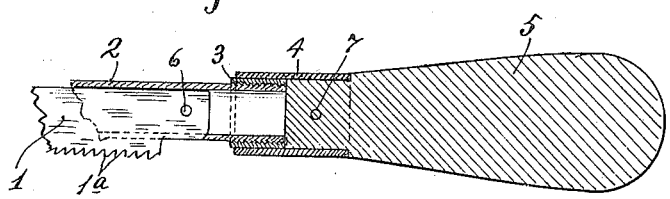
Fig. 4 is a partial central vertical section of Fig. 2.

Referring to the drawings:

A tool is shown comprising a bar 1 of small thickness which is provided on one edge with teeth 1ª in the nature of fine milling teeth. The bar 1 is curved at its outer end and is disposed in a slot formed longitudinally of a cylindrical member 2, the bar extending across the inside of the said member. The member 2 is pressed together against the bar and the latter is further clamped therein by the member 2, being threaded at its end and screwed into a sleeve member 3. This member 3 is secured by a brazing or welding to the inner side of a sleeve member 4 forming a ferrule for a handle 5. Holes 6 and 7 are provided through the members 1 and 2 and the members 4 and 5 respectively for the insertion of nails or pins to conveniently turn the member 2 relatively to the member 3 to screw the parts together.

The operation of the tools is illustrated in Fig. 1 and it will be seen that the same can be conveniently reciprocated to undercut the mica of the commutator. The member 2 can be quickly unscrewed from the member 3 and different blades inserted as desired.

From the above description it is seen that applicant has provided a simple and efficient tool for the purpose intended and which can be easily and inexpensively made.

It will, of course, be understood that various changes may be made in the form, arrangement and proportion of the parts without departing from the scope of applicant's invention, which generally stated consists in the matter shown and described and set forth in the appended claims.

What is claimed is:—

1. A tool of the kind described comprising a handle, a cylindrical member extending from said handle having a longitudinal slot therein and a toothed bar disposed in said slot and detachably clamped between the sides of said slot.

2. A tool of the kind described comprising a toothed bar, a cylindrical member having a longitudinal slot therein in which said bar is clamped and a handle having means for receiving said sleeve and contracting the same to clamp said bar in place.

3. A tool of the class described comprising a toothed bar, a cylindrical member having a longitudinal slit in which said bar is disposed and means for clamping said bar in said slit.

4. A tool of the kind described comprising a toothed bar, a hollow cylindrical member slitted to receive said bar, a sleeve into which said member is threaded to clamp the bar therein and a handle having a ferrule at one end in which said sleeve is secured.

5. A tool of the kind described comprising, a flat bar having a toothed edge and a plane edge parallel thereto, a tube having a longitudinal slot therein in which said bar is disposed with said plane edge in contact with the inner side of the said tube opposite said slot, and said toothed edge projecting from said slot, means for contracting said tube to clamp said bar therein, and a handle carrying said means.

In testimony whereof I affix my signature.

WILLIAM W. HILL.